US007047206B1

(12) United States Patent
Schultze (10) Patent No.: US 7,047,206 B1
(45) Date of Patent: May 16, 2006

(54) AUTOMATIC LEAD DISTRIBUTION AND PROCESSING CONFIRMATION SYSTEM AND METHOD

(76) Inventor: Axel Schultze, 30816 Belle Maison, Laguna Niguel, CA (US) 92677

( * ) Notice: Subject to any disclaimer, the term of this patent is extended or adjusted under 35 U.S.C. 154(b) by 0 days.

(21) Appl. No.: 09/514,997

(22) Filed: Feb. 25, 2000

(51) Int. Cl.
G06Q 99/00 (2006.01)

(52) U.S. Cl. ..................................................... 705/10
(58) Field of Classification Search ................. 705/10, 705/9

See application file for complete search history.

(56) References Cited

U.S. PATENT DOCUMENTS

| 5,576,951 | A |   | 11/1996 | Lockwood ................... 705/27 |
| 5,915,246 | A | * | 6/1999  | Patterson et al. ............. 705/10 |
| 5,930,764 | A | * | 7/1999  | Melchione et al. ........... 705/10 |
| 6,055,513 | A | * | 4/2000  | Katz et al. .................... 705/10 |
| 6,067,525 | A | * | 5/2000  | Johnson et al. ............... 705/10 |
| 6,070,142 | A | * | 5/2000  | McDonough et al. .......... 705/7 |
| 6,078,892 | A | * | 6/2000  | Anderson et al. ............. 705/10 |
| 6,208,975 | B1| * | 3/2001  | Bull et al. ..................... 705/10 |
| 6,236,977 | B1| * | 5/2001  | Verba et al. ................... 705/10 |

FOREIGN PATENT DOCUMENTS

WO    WO 2005/065349 A2  *  7/2005

OTHER PUBLICATIONS

Hochhauser, Richard. "The Interactive Evolution of a Direct Marketing Lender". Direct Marketing. May 2000. vol. 63, Issue 1. pp. 45-48.*
Boudrow, Ellis. "Chamber Referral Program Not for All Real Estate Agents." The Business Journal-Charlotte, vol. 5, No. 27, s1, p. 2, Oct. 22, 1990.*
Eng, Sherri. "Information Interviews Put a Job Search on the Fast Track." St. Louis Post Dispatch, Business Section, p. C8, Aug. 13, 1998.*
Cates, Bill. "Why You Need a Hit List." On Wall Street, vol. 9, No. 12, p. 77, Dec. 1999.*
Jones, Chuck. "Future Legends: Kimberly J. McKown." Life Association News, vol. 87, No. 2, pp. 65-66, Feb. 1992.*
Lamey, Mary. "The Sushi Connection." Montreal Gazette, Final ED, p. F3, Jul. 4, 1994.*
"Vignette Announces Developer and Affiliate Programs to Accelerate Deployment of Web Businesses With Storyserver 3." PR Newswire, p. 1013SFM019, Oct. 13, 1997.*

* cited by examiner

Primary Examiner—Susanna M. Diaz
(74) Attorney, Agent, or Firm—Fenwick & West LLP (57) ABSTRACT

A system and method for efficiently, accurately, and inexpensively receiving, assigning, and tracking leads. A lead unit integrates and stores the sales leads. A lead control unit can interface with an administrative unit to provide active leads to a reseller unit. A reseller control unit can determine whether a user is permitted to select leads. Selected leads can be removed from the set of active leads for a predetermined time period. The user can process a selected lead and identify a result for the lead. The lead control unit can place a selected and processed lead into a processed lead set. The reseller control unit can generate reports about the user's active or processed leads.

53 Claims, 10 Drawing Sheets

LeadSource1

Available Leads for Web Development Corp.

Quick Search: [____________] [Search]

Reset Search

You have 4 active leads. You may select up to 6 more leads.

| Date ▲▼ | Company ▲▼ | City ▲▼ | State ▲▼ | Zip ▲▼ | Vendor ▲▼ | Product ▲▼ | Select |
|---|---|---|---|---|---|---|---|
| 09-Feb-2000 | Custom Computer Services | Louisville | KY | 40222 | IpSwitch | IMail Server | ☐ |
| 09-Feb-2000 | KTECH | Vandalia | OH | 45377 | IpSwitch | IMail Server | ☐ |
| 09-Feb-2000 | Integrity Online | Hesperia | CA | 92345 | IpSwitch | IMail Server | ☐ |
| 09-Feb-2000 | Westworld Communications | Chatsworth | CA | 91311 | IpSwitch | IMail Server | ☐ |
| 09-Feb-2000 | Custom Home Automation | Wixom | MI | 48393 | IpSwitch | IMail Server | ☐ |
| 09-Feb-2000 | Auction Live TV Inc. | St. Louis | MO | 63033 | IpSwitch | IMail Server | ☐ |
| 09-Feb-2000 | Pc3 | Brighton | CO | 80601 | IpSwitch | IMail Server | ☐ |
| 09-Feb-2000 | DIGITAL2 | H.P. | IL | 60035-1076 | IpSwitch | IMail Server | ☐ |
| 09-Feb-2000 | Kritech | Oklahoma City | OK | 73170 | IpSwitch | IMail Server | ☐ |
| 09-Feb-2000 | Berios Inc. | Baltimore | MD | 21219 | IpSwitch | IMail Server | ☐ |

Select / Active Leads / Feedback / Reports / Account / Help / Logout — 602

LeadSource1

Active Lead Detail

Company: KTECH
Address1: 1244 CRESTWOOD HILLS DRIVE
City: Vandalia
State: OH
Zip: 45377
Country:
Company Website:

Contact Name: Khamla Ramont
Contact Title:
Phone Number: +1 (781) 898-0053
e-mail: enduser@internet2000.com Vendor: Ipswitch
Product: Imail Server
Lead Generated: 09-Feb-2000
Lead Selected: 22-Feb-2000

Internet2000

- Select
- Active Leads
- Feedback
- Reports
- Account
- Help
- Logout

FIGURE 8

LeadSource1

Sales Lead Feedback
Leads Currently Selected by Web Development Corp.

You have 6 active leads.

| Selected | Generated | Company | Product | Status | Days Left |
|---|---|---|---|---|---|
| 18-Feb-2000 | 09-Feb-2000 | CNC Technologies | IMail Server | No Interest ▼ | 11 |
| 18-Feb-2000 | 09-Feb-2000 | PC SAMS LLC | IMail Server | ▼ | 11 |
| 18-Feb-2000 | 09-Feb-2000 | ADG | IMail Server | Purchased ▼ | 11 |
| 22-Feb-2000 | 09-Feb-2000 | NA | IMail Server | ▼ | 14 |
| 22-Feb-2000 | 09-Feb-2000 | KTECH | IMail Server | Project ▼ | 14 |
| 22-Feb-2000 | 09-Feb-2000 | eagle computers | IMail Server | ▼ | 14 |

[Submit] [Clear]

Select | Active Leads | Feedback | Reports | Account | Help | Logout

FIGURE 9

AUTOMATIC LEAD DISTRIBUTION AND PROCESSING CONFIRMATION SYSTEM AND METHOD

BACKGROUND OF THE INVENTION

1. Field of the Invention

This invention relates to the field of lead distribution and processing and more particularly to automatic lead distribution and processing confirmation systems and methods in a computer based environment.

2. Description of Background Art

Many businesses spend significant resources advertising their wares and services in order to attract clients. Oftentimes the success rate of many promotion activities such as direct mailings or cold-calls is low and inefficient. These direct mass mailings are frequently sent to users who have no interest or need for the advertised product or service. For example, an advertisement for the latest computer software program will typically not be effective if sent to a person who does not own or use a computer.

To increase the effectiveness of a sales force and of advertising resources, many companies focus their resources on potential customers who are more likely to be interested in the products or services. With reference to a sales force these potential customers are often called "leads." The current method of developing and using leads has many problems. One such problem is that it is often difficult to identify promising leads. Another is that even when a promising lead is identified the lead is frequently "cold." An example of a cold lead is one that at one time was interested in a product or service but has since become less interested.

A related problem is that companies (lead aggregators) often have a large number of leads based upon a variety of sources, e.g., Internet or mail registrations, marketing responses, etc. Oftentimes, these companies cannot follow up with all of these leads and as a result many of the leads are not contacted or become cold by the time they are contacted. Not only does this result in a lost opportunity but the lead may be expecting to be contacted so a significant delay in contacting the lead may make the lead less likely to purchase or use a product or service and can result in a loss of good will.

When a lead is expecting to be contacted, a company may assign the lead to a particular reseller or salesman who may not contact the lead in a timely manner, or may not contact the lead at all. Many companies do not have efficient systems and methods in place to track leads. Therefore the risk of reducing the company's good will because a lead is not properly or quickly contacted is a significant concern.

Another problem with conventional systems and methods is that a lead is often given to multiple resellers since no efficient techniques exist for matching the lead with a reseller and since no efficient follow-up system is in place. It is not uncommon for a lead to be contacted by many resellers which may bother the lead.

In addition, the large list of leads generated by such companies is of significant value to many resellers of products or services. However, these companies have no way of efficiently finding a reseller or salesman who is interested in receiving the lead. Another problem is that the company generating the leads may want to receive some compensation or benefit for each lead that results in a successful sale. Currently the company generating leads must rely on the reseller or salesman to accurately disclose the results of the leads. Another problem is that the lead aggregators may want to perform some pre-screening and pre-qualification of the reseller and/or the leads to make sure that the leads are matched with appropriate resellers. For example, a quality lead, e.g., a lead that may be the source of significant sales, should be matched with a high quality reseller. Currently, such matching is difficult and time consuming and, therefore, is rarely done.

Another problem with conventional systems is that resellers typically must contact the lead without any introduction. This cold-call makes the reseller's task more difficult. Currently, there is no efficient way of introducing leads to resellers.

Such conventional systems and methods for identifying and processing leads are inefficient and inaccurate. They do not enable leads to be efficiently identified, they permit a large number of leads to become cold, they permit a large number of leads to not be contacted, have no system or method in place to verify when a lead is contacted, and they do not have an efficient system or method for accurately reporting results of the contacts.

Accordingly, what is needed is a system and method that (1) enables leads to be efficiently identified by an interested partner, salesman, or reseller; (2) reduces the number of leads that become cold; (3) motivates a reseller to promptly contact the lead; (4) automatically provides feedback to the lead and/or to the source of a lead when a reseller selects a lead and when the reseller processes the lead; (5) provides a system and method for automatically evaluating the result of a contact; (6) automatically increases the accuracy of the reporting of results; and (7) automatically introduces the reseller to a lead.

SUMMARY OF THE INVENTION

The invention is a system and method for efficiently, accurately, and inexpensively receiving, assigning, and tracking leads. In one embodiment, the invention enables leads to be efficiently identified by an interested salesman or reseller by providing a database of leads that can be searched according to a variety of parameters. In one embodiment, the invention also reduces the number of leads that become cold by quickly and efficiently matching sources of leads with a variety of salesmen/resellers/users who are interested in utilizing a lead. In one embodiment, the present invention motivates a reseller to promptly contact a lead that the reseller selects by limiting the amount of time that a lead is available exclusively to the reseller. The reseller must contact the lead before the lead becomes available again to other resellers. In one embodiment, the invention also automatically provides feedback to the lead and/or to the source of a lead when a reseller selects a lead and when the reseller processes the lead in order to increase the accountability of the reseller. In an embodiment, the invention also provides a system and method for automatically evaluating the result of a contact which enables the lead source to better track the results of providing leads. In an embodiment, the present invention also automatically increases the accuracy of the reporting of results by automatically sending the results of the contact, as reported by the reseller, to the lead, the system administrator, and to the lead source. In addition, the present invention automatically introduces the reseller to a lead before the lead is contacted by the reseller.

DETAILED DESCRIPTION OF THE PREFERRED EMBODIMENTS

A preferred embodiment of the present invention is now described with reference to the figures where like reference numbers indicate identical or functionally similar elements. Also in the figures, the left most digit of each reference number corresponds to the figure in which the reference number is first used.

The invention is directed toward a system and method for efficiently, accurately, and inexpensively receiving, assigning, and tracking leads. In one embodiment, the invention enables leads to be efficiently identified by an interested salesman or reseller by providing a database of leads that can be searched according to a variety of parameters. In one embodiment, the invention also reduces the number of leads that become cold by quickly and efficiently matching sources of leads with a variety of salesmen/resellers/users who are interested in utilizing a lead. In one embodiment, the present invention motivates a reseller to promptly contact a lead that the reseller selects by limiting the amount of time that a lead is available only to the reseller. If the reseller does not contact the lead before the time limit expires, the lead becomes available again to other resellers. In one embodiment, the invention also automatically provides feedback to the lead and/or to the source of a lead when a reseller selects a lead and when the reseller processes the lead in order to increase the accountability of the reseller. In an embodiment, the invention also provides a system and method for automatically evaluating the result of a contact which enables the lead source to better track the results of providing leads. In an embodiment, the present invention also automatically increases the accuracy of the reporting of results by automatically sending the results of the contact, as reported by the reseller, to the lead, the system administrator, and to the lead source. Not all of the above features and elements are necessary for the operation of the invention, instead the features listed above include some of the features in the numerous embodiments of the invention.

Figure 1:
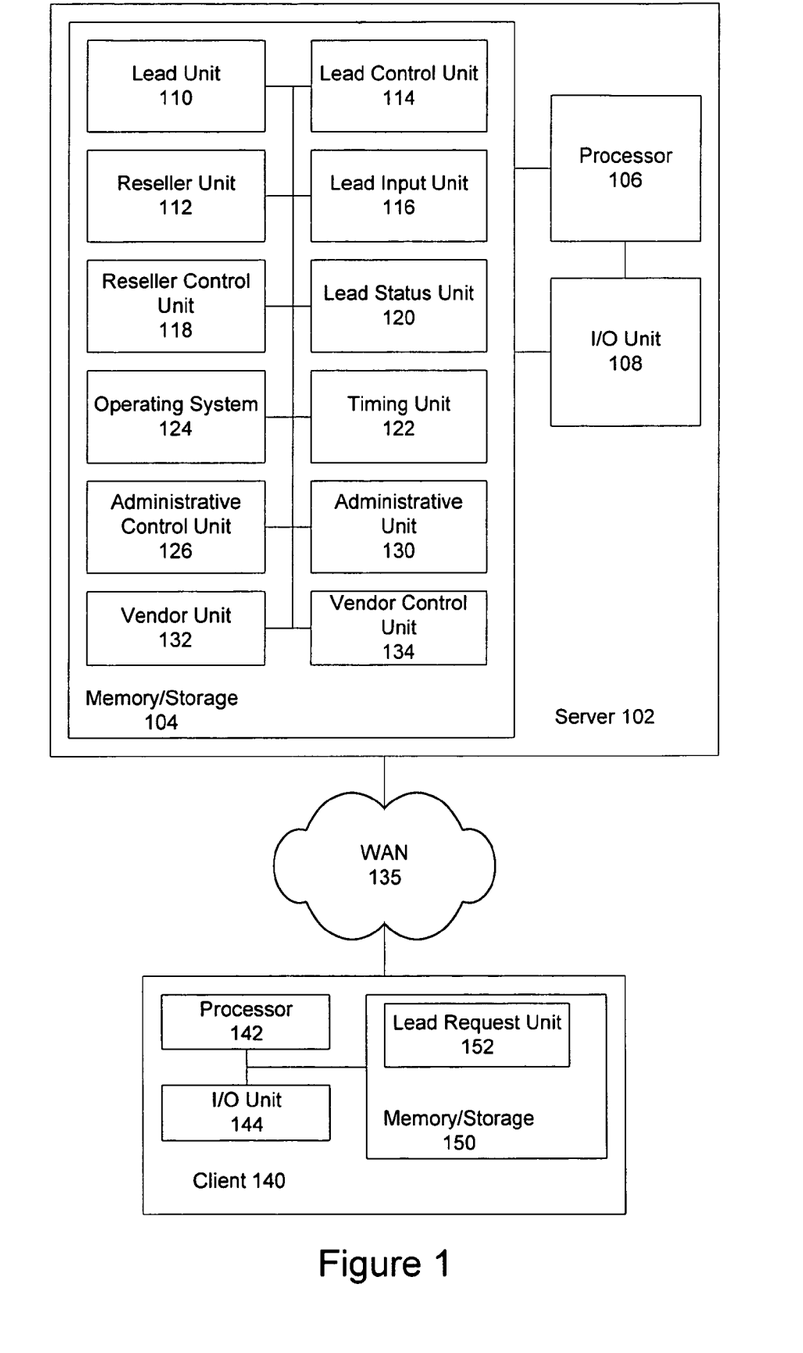
FIG. 1 is an illustration of a computer environment in which the present invention can operate.

FIG. 1 is an illustration of a computer environment in which the present invention can operate. This embodiment includes a client computer 140 and a server computer 102.

As described below, this is one example of the computer environment and is not intended to limit the scope of this invention. The server 102 includes a processor 106, an input/output (I/O) unit 108 and a conventional memory/storage unit 104. The processor 106 can be a conventional processor, e.g., a Pentium III processor that is commercially available from Intel Corporation, Santa Clara, Calif. The I/O unit 108 is conventional and permits the server 102 to communicate with other computers, networks, and peripheral devices, for example. The memory/storage unit 104 is a conventional memory/storage unit.

The memory/storage unit 104 includes a lead unit 110, a reseller unit 112, a lead control unit 114, a lead input unit 116, a lead status unit 120, a timing unit 122, an operating system unit 124, an administrative unit 130, an administrative control unit 126, a vendor unit 132 and a vendor control unit 134. The operation of these units is described below.

The server 102 is connected to a wide area network (WAN) 135. As described below, this is only one embodiment of the invention. The WAN 135 is coupled to the client 140 which may be located at a site remote from the server (but need not be in alternate embodiments). The client includes a conventional processor 142 an I/O unit 144 and a memory storage module 150 that includes software such as the lead request unit 152 that is described in greater detail below.

The memory/storage modules 104, 150 can be conventional memory devices, e.g., random access memory (RAM), read only memory (ROM), a floppy disk, a compact disc ROM (CD-ROM), a compact disc recordable disk (CD-R/W), or a digital versatile disk (DVD), for example.

FIG. 1 illustrates one embodiment in which the present invention can operate (a client-server environment). However, many other computer system environments can be used. For example, it will be apparent to persons of ordinary skill in the art that the entire invention can be part of a single computer or can be part of a local area network. In addition, the individual units can be performed on separate computers instead of only a single server, and some of the functions can be distributed to one or more computers, e.g., the client 140, described above. In addition, the invention can be part of any computer system, e.g., a personal digital assistants (PDA), such as a conventional Palm Pilot, that is commercially available from 3Com, in Santa Clara, Calif., a mobile phone, or any type of computing device. The connections may be wireline or wireless. It will be apparent that many different types of computer based environments may be used without departing from the scope of the present invention.

As described above, the present invention addresses a variety of problems of finding, distributing and processing leads. In one embodiment, a lead source sends a set of leads to a system administrator (via the administrative unit 130) who places the leads into the lead unit 110, e.g., a database. This process can also be performed automatically. The lead unit 110 can include leads from many lead sources. As described above, the lead source can identify the leads based upon a wide variety of techniques such as mail registration, Internet registration, electronic mail requests, etc. A reseller, who can also be referred to as a salesman or user, is a person who utilizes the system to locate leads. The operation of the invention is now described with respect to these participants.

Figure 2:
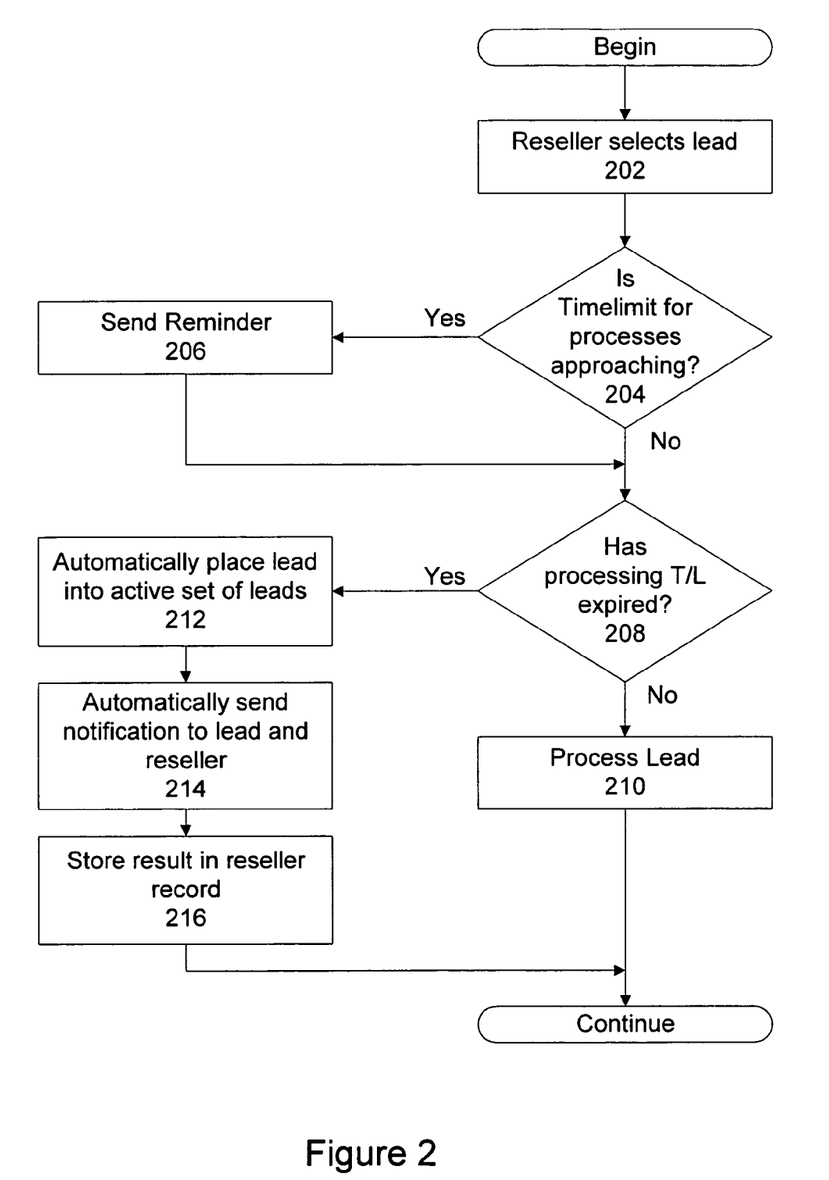
FIG. 2 is a flowchart illustrating a method of selecting and processing a lead according to the preferred embodiment of the present invention.
Figure 3A:
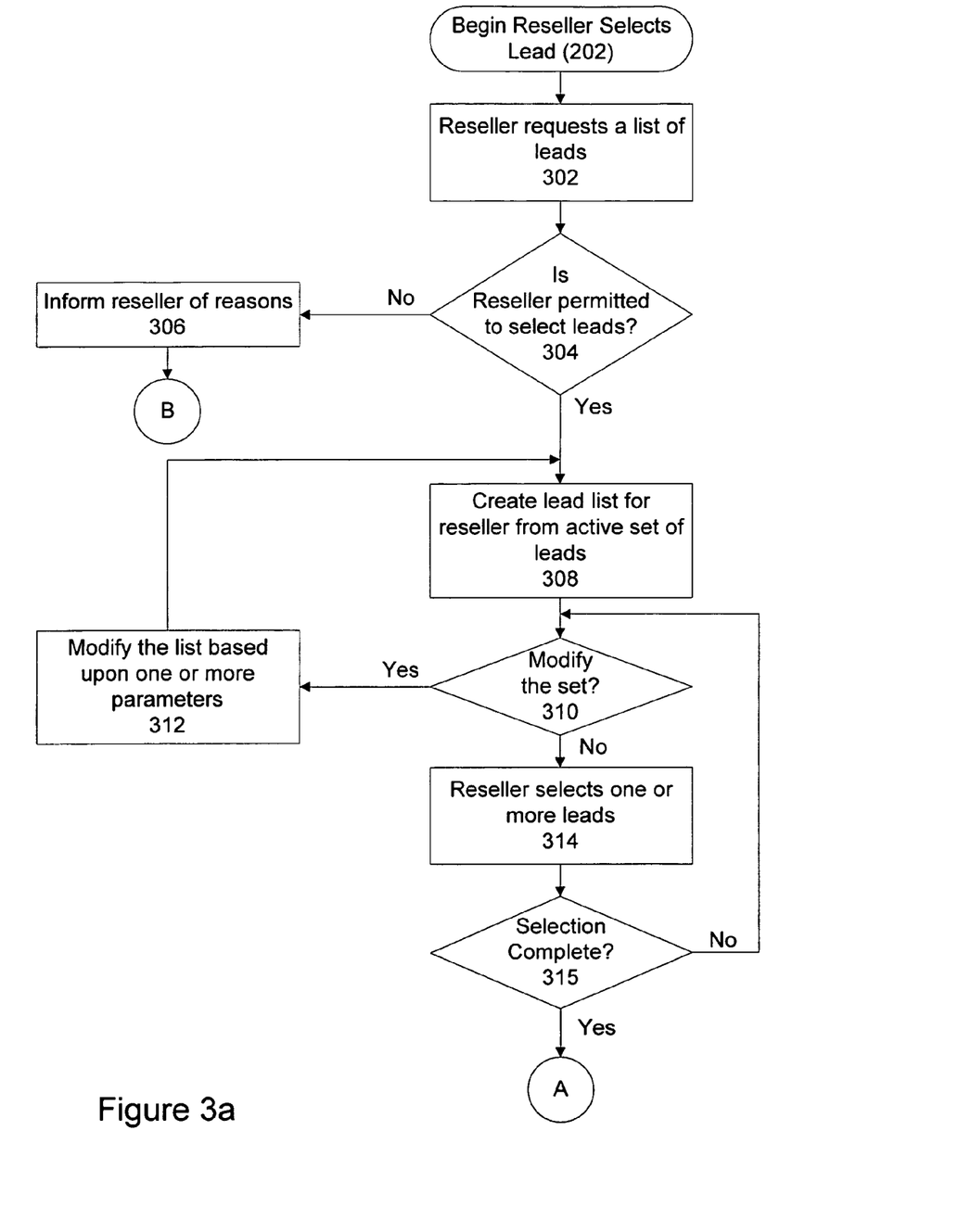
FIGS. 3a and 3b are flowcharts illustrating a method of selecting a lead according to the preferred embodiment of the present invention.
Figure 3B:
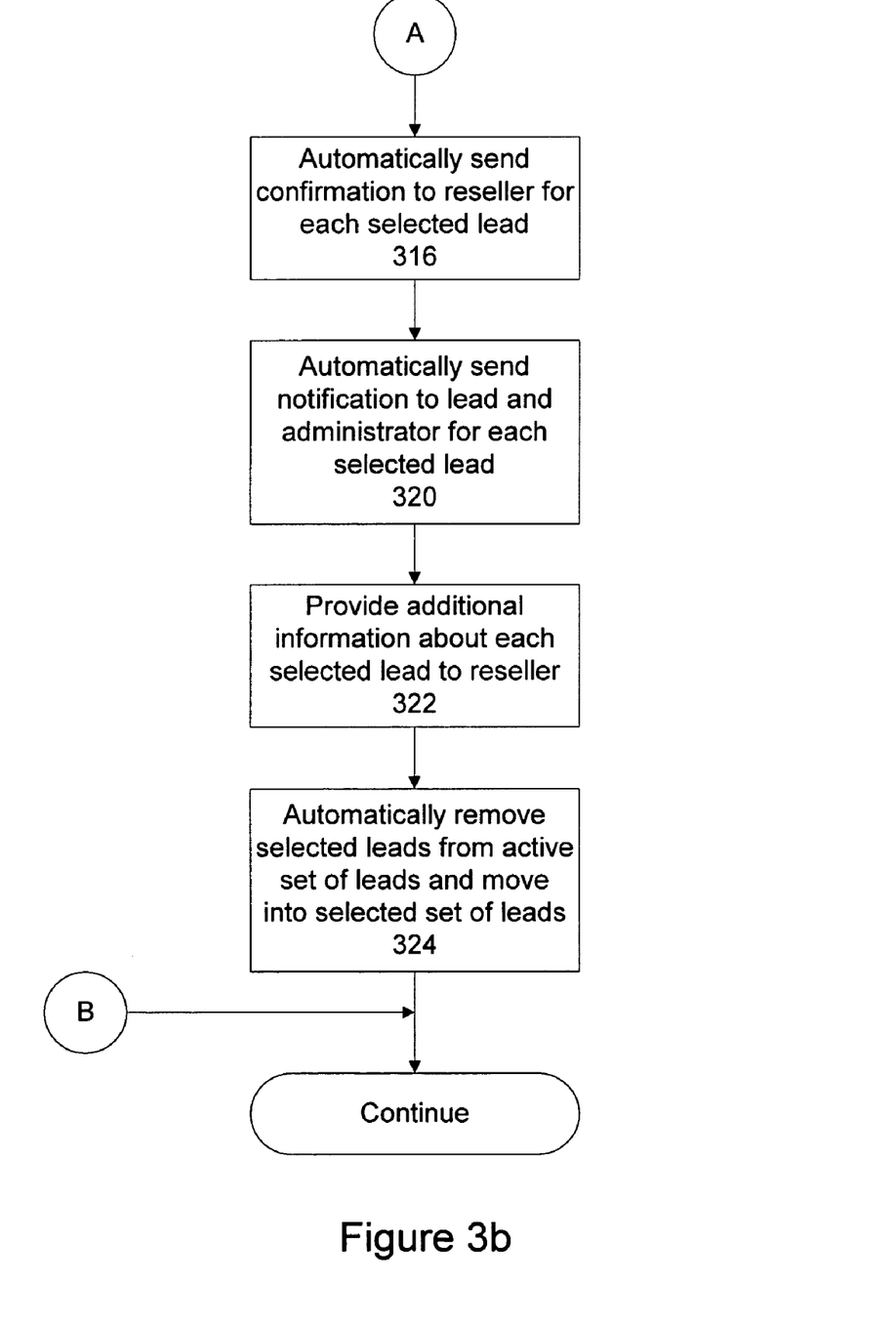

FIG. 2 is a flowchart illustrating a method of selecting and processing a lead according to the preferred embodiment of the present invention. The reseller selects 202 a lead. A more detailed description of this selection process is set forth with respect to FIGS. 3a and 3b. FIGS. 3a and 3b are flowcharts illustrating a method of selecting 202 a lead according to the preferred embodiment of the present invention. When selecting 202 a lead, the reseller first requests 302 a list of potential leads. The reseller can use a variety of variables or parameters to reduce the number of leads that will appear in the list. For example, the reseller can request leads associated with a particular product and/or in a specific geographical location. It will be apparent that many different parameters can be associated with leads and the examples described herein are merely illustrative. In the preferred embodiment the number of selected but not-processed leads can be limited in order to prevent the hoarding of leads and to encourage resellers to quickly contact and process a lead. In addition, there may be other requirements that the reseller must meet in order to select leads.

The present invention may also perform some pre-screening of leads. The lead control unit 114 performs a matching operation by contacting the reseller control unit 118 which searches the attributes of the resellers and matches the reseller's interests with attributes of the lead. For example, attributes of the lead such as the product they are interested in are matched to the reseller's interest and qualifications in order to match the interests of the lead with the reseller.

The administrative unit 130 in conjunction with the reseller unit 112 and the reseller control unit 118 determines 304 whether the reseller is permitted to select leads. If not, the reseller is informed 306 of the reasons for not being able to select leads, e.g., too many outstanding selected and non-processed leads, and the process continues. At this point the reseller may be permitted to process some of the selected leads using the techniques described below.

If the reseller is permitted to select a lead, the lead control unit 114 creates 308 a lead list from a set of active leads in the lead unit 110. This set may, optionally, be a subset of the total active set based upon the requirement that one or more parameters be satisfied, as describe above. The reseller may decide 310 that the set is too broad or is too narrow and can modify 312 the set to account for different parameters of the leads in which case the lead control unit 114 creates 308 another set of leads based upon the updated parameters. The reseller may select 314 one or more leads from any of these lead lists and may continue 315 to modify 312 the set and select 314 one or more leads until they reach their lead limit.

One feature of the present invention is that when a lead is selected the administrative unit 130 receives the selected lead from the lead control unit 114 and automatically sends 316 a confirmatory indicator, e.g., an e-mail, to the reseller which confirms the selection. In addition, the administrative unit 130 automatically sends 320 a notification to the lead informing the lead that they have been selected. This notification serves several functions. Specifically it provides an introduction of the reseller to the lead and informs the lead that they should expect to be contacted by the reseller. This serves to increase the chance of a successful contact by eliminating the need for the reseller to cold-call the lead and it also provides an incentive to the reseller to contact the lead in a timely manner since the lead is expecting to be contacted. This notification may also include "cross-selling," e.g., providing information about other relevant products or services that may be of interest to the lead. Cross-selling information may be provided by the lead source, system administrator and/or reseller. In some embodiments the administrative unit 130 automatically sends 320 the lead the name of the reseller and provides to the lead a time period in which the lead should expect to be contacted by the reseller. In addition, the administrative unit automatically sends 320 a notification to the reseller control unit 118 identifying the lead and the time of selection. This feature of the present invention provides motivation to the reseller to quickly contact a lead because the lead is aware that they have been selected. In addition, as described below, in one embodiment, the time period in which the reseller can maintain the lead exclusively is limited. That is, the time period in which the lead is not in the active set of leads is limited. The reseller control unit 118 receives an indication of the selection and stores the selected lead information along with the selection time in the reseller unit 112.

The lead control unit 114 provides 322 additional information about each selected lead to the reseller. This additional information can include but is not limited to specific contact information such as a contact name(s), company name, website, phone number, fax number, address, e-mail address, origin of lead, origination date of lead, product interest(s), language, and lead company information. The lead control unit 114 then automatically 324 removes the selected lead(s) from the active set of leads and places them in a "selected" set of leads. Only those leads that are in the active set of leads can be selected by another reseller. As will be described in greater detail below, the administrative unit 130 in conjunction with the timing unit 122 may limit the amount of time an unprocessed lead is removed from the active set of leads.

The order of operation described above and illustrated in FIGS. 3a and 3b is one example of the method of the present invention. In alternate embodiments the order of steps may differ. For example, the lead control unit 114 can provide additional information to the reseller before the confirmation and notifications are sent 316, 318.

Referring again to FIG. 2, after the reseller selects 202 a lead, the administrative unit 130 determines 204 whether a time limit for processing the lead is approaching. The administrative unit 130 can perform this periodically in order to identify when the time limit arrives, e.g., checking every day, hour, minute, second or continuously, for example. If the time limit is approaching, e.g., if the time-limit is one day away, the administrative unit 130 sends 206 a reminder to the reseller indicating that the lead should be processed before a deadline. In alternate embodiments, no warning is sent and the administrative unit 130 in conjunction with the timing unit 122 determines 208 whether the processing time limit has expired. If the processing time limit has expired the lead control unit 114 in response to the administrative unit 130 automatically places 212 the lead into the active set of leads by, for example, changing a flag value of the lead. The administrative unit 130 also automatically sends 214 a notification to the lead, e.g., via an e-mail message or facsimile. In addition, the vendor unit 132 may automatically notify the the lead source (lead aggregator). The administrative unit 130 may also contact the reseller automatically or may contact a system administrator to inquire as to why the lead was not contacted and processed. The administrative unit 130 also instructs 216 the reseller control unit 118 to store this expiration information in the reseller unit 112. This information can be used to provide feedback to the reseller and the lead source, for example. The feature of limiting the time period in which a selected lead is taken off the active set of leads reduces the number of leads that become cold and motivates a reseller to promptly contact the lead since after the time period expires the lead will become available to the rest of the resellers. If the processing time limit has not expired the reseller may process 210 the lead.

Figure 4:
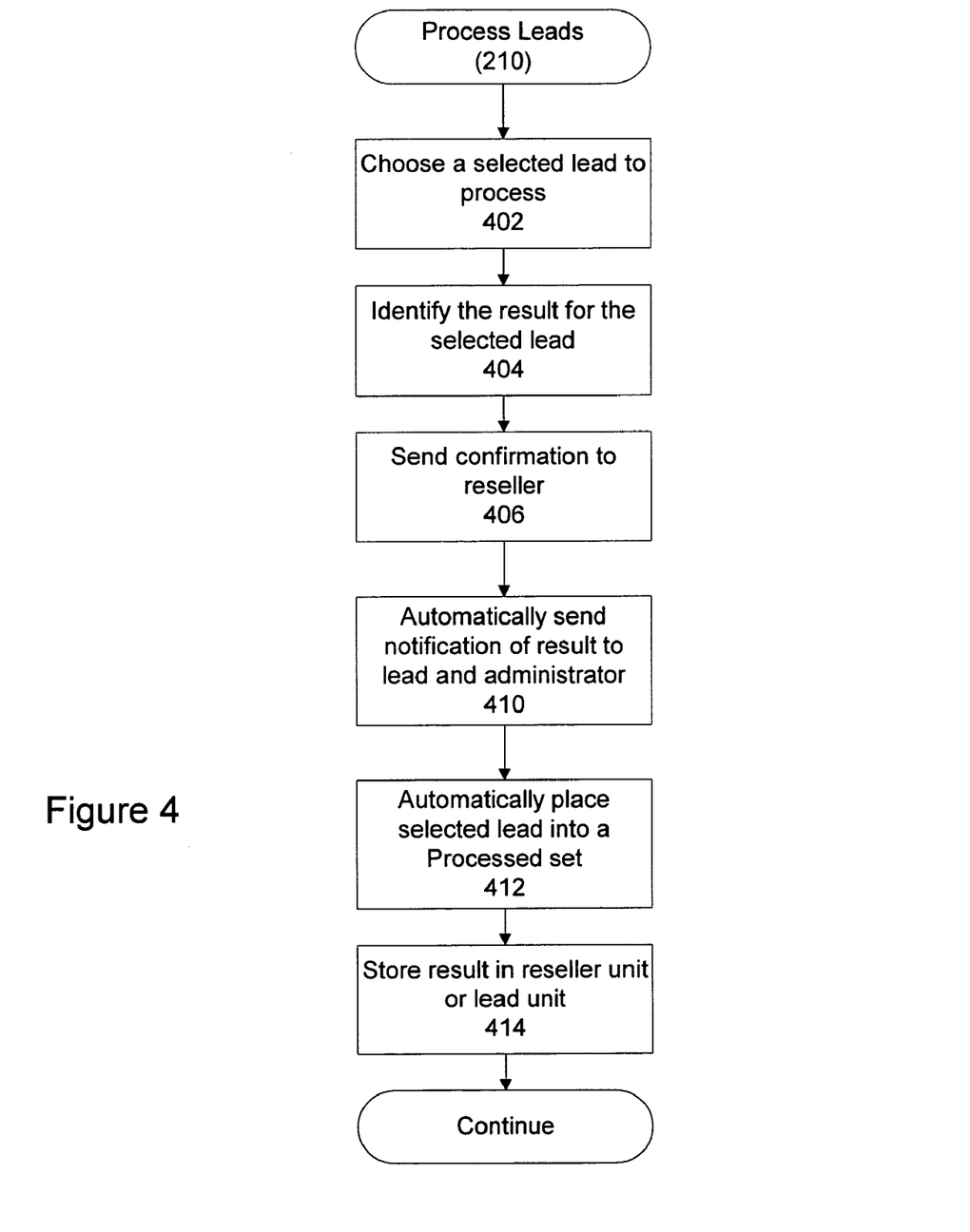
FIG. 4 is a flowchart illustrating a method of processing leads according to the preferred embodiment of the present invention.

FIG. 4 is a flowchart illustrating a method of processing leads according to the preferred embodiment of the present invention. After contacting a lead (or attempting to contact a lead), the reseller can proceed to process the lead. The reseller chooses 402 one of the previously selected leads to process and identifies 404 the result for the selected lead. The user may select one of a predefined set of results such as "sale," "no interest," "evaluation," and "project". For example; an "evaluation" result means the lead is evaluating a product and/or lead sales information. In an embodiment, the system may require a fixed time limit for the "evaluation". The "evaluation" result may only be chosen once per lead. Once the evaluation time limit is over, the reseller may process and identify 404 the result for the lead. A "project" result identifies a lead that may be using the product(s) in a larger project and further sales follow-up may be needed. In an embodiment, the system may follow-up on leads that are processed with a "project" result.

In alternate embodiments, the reseller can enter a description of the result and/or a combination of a predefined set of results. Accordingly, once the reseller enters the result information the present invention automatically processes the result and sends the above described confirmation and notification.

As described above, a feature of the present invention is that it automatically increases the accuracy of the reporting process when compared to conventional systems and methods. The present invention accomplishes this by automatically sending 404 a confirmation of the processing result to the reseller and by automatically sending 410 a notification of the result to the lead and to the administrative unit 130. It is unlikely that a reseller would misrepresent or otherwise intentionally process an inaccurate result knowing that the lead will be notified of the result. Accordingly the present invention increases the accuracy of the reports.

The lead control unit 114 then automatically places the selected and processed lead into a "processed" set of leads by changing a flag value associated with the lead, for example. The leads in the processed set are not available to be selected by resellers unless, in some embodiments, they are independently received into the system again via the lead input unit 116. The reseller control unit 118 then stores 414 the processed result with the reseller record in the reseller unit 112 and/or the lead unit 110.

As described above, leads can be input into the system using a variety of techniques via a lead input unit 116. In general, a lead source will have the necessary lead information in a storage device, e.g., a hard disk drive, and will transfer the lead data from the lead source's storage device to the lead unit 110 via the lead input unit 116. The lead input unit may translate information and reformat the lead data to match the format of the lead data. Many different formats may be used without departing from the scope of the present invention. In addition many different techniques are available for transferring the data from the lead source's storage device to the lead unit, e.g., over the Internet, and such techniques will be apparent to persons of ordinary skill in the art.

In addition, in the preferred embodiment, the reseller, lead source and the lead can check the status of the lead using any one of a variety of techniques. In the preferred embodiment the lead status request will provide the current selection status of the lead (active, selected, processed) and if processed the result of the processing and the reseller. It will be apparent that additional information may be presented during a status request.

Figure 5:
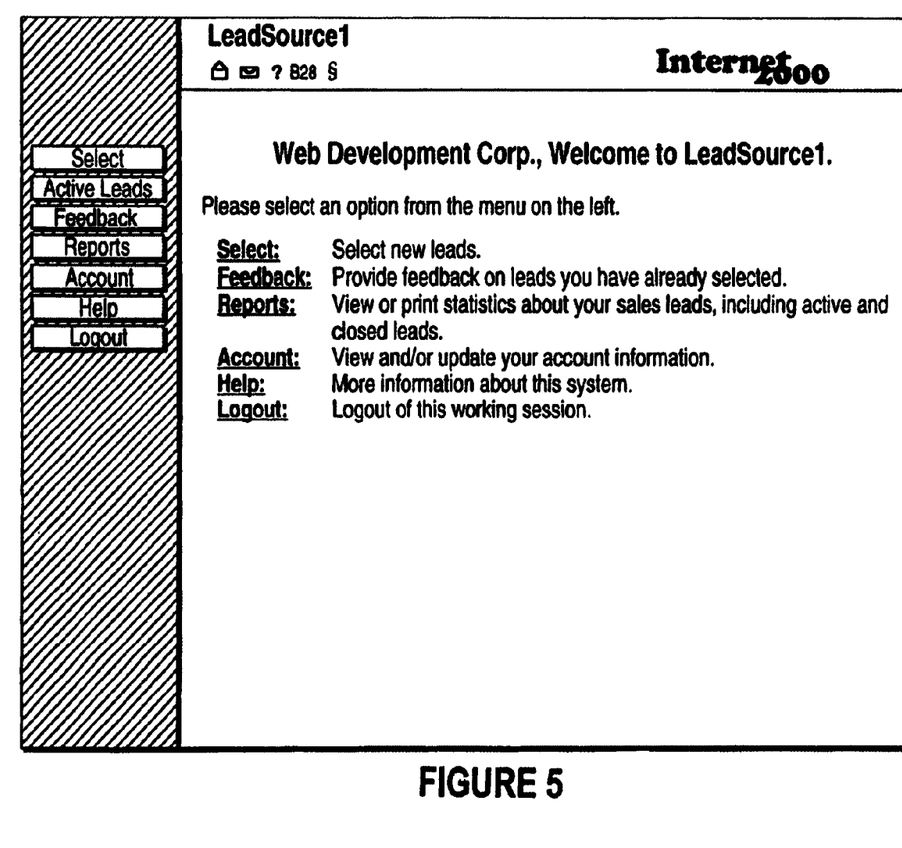
FIG. 5 is an illustration of a computer screen display available to a user according to one embodiment of the present invention.
Figure 6:
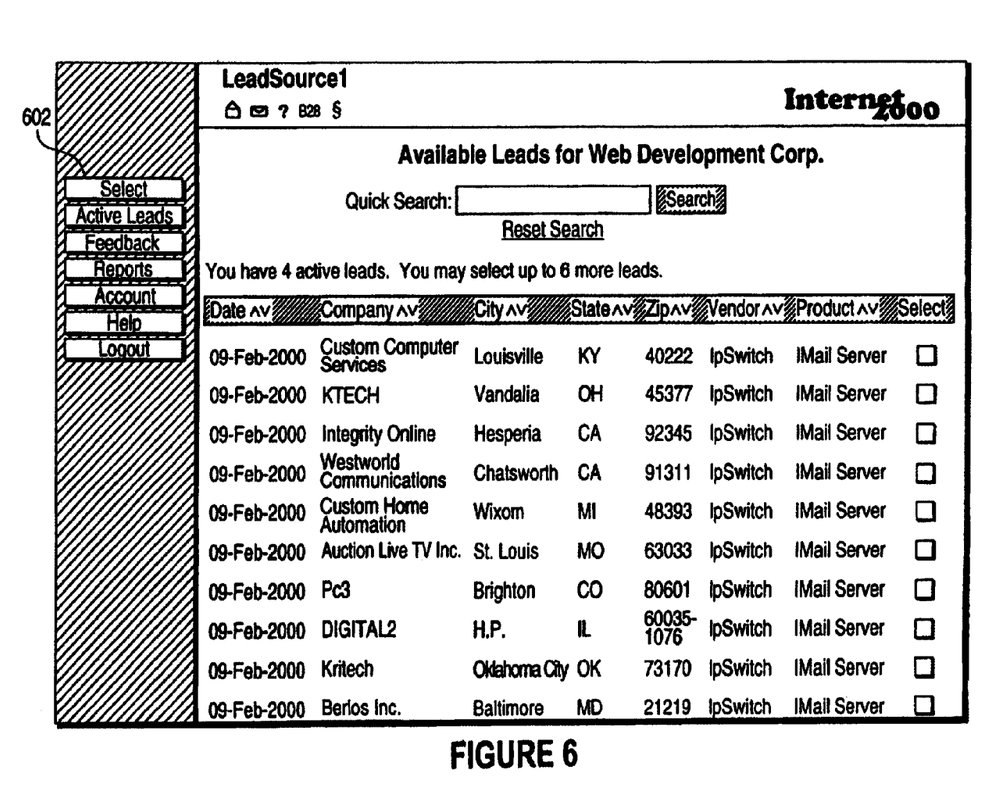
FIG. 6 is an illustration of a computer screen display showing a lead search result according to one embodiment of the present invention.

One embodiment of the present invention is described using computer screen displays set forth in FIGS. 5–9. This example describes the lead selection and processing aspects of the invention and is described with reference to FIGS. 2–4. The scope of the claimed invention is not limited by this preferred embodiment. FIG. 5 is an illustration of a computer screen display available to a user according to one embodiment of the present invention. A reseller connects to the system, e.g., over a network, e.g., a WAN 135 such as the Internet or an intranet, telephone network or faxnet, for example. A screen is displayed to the reseller giving the reseller a variety of options such as selecting a new lead, processing (providing feedback on) a lead, or various administrative options, for example. After requesting 302 to select a lead, the reseller is presented with the ability to execute a search of all of the leads in the lead unit 110. As described above, the reseller can request to execute a search command using a variety of different parameters in many different fields. In this example, the fields are Date, "Company," "City," "State," "Vendor," and "Product," as shown in FIG. 6. FIG. 6 is an illustration of a computer screen display showing a lead search result according to one embodiment of the present invention. From the list of leads the reseller selects 314 one or more leads. In this example, the reseller can use a computer keyboard or a pointing device to select the lead by giving an indication in the "Select" box. Such an indication can be by using a conventional pointing device and "clicking" on the select box 602. In addition, this page provides the reseller with information about the number of active leads they have and the number of leads that the reseller may select. In this example, the reseller has four active leads and can select up to six additional leads.

Figure 7:
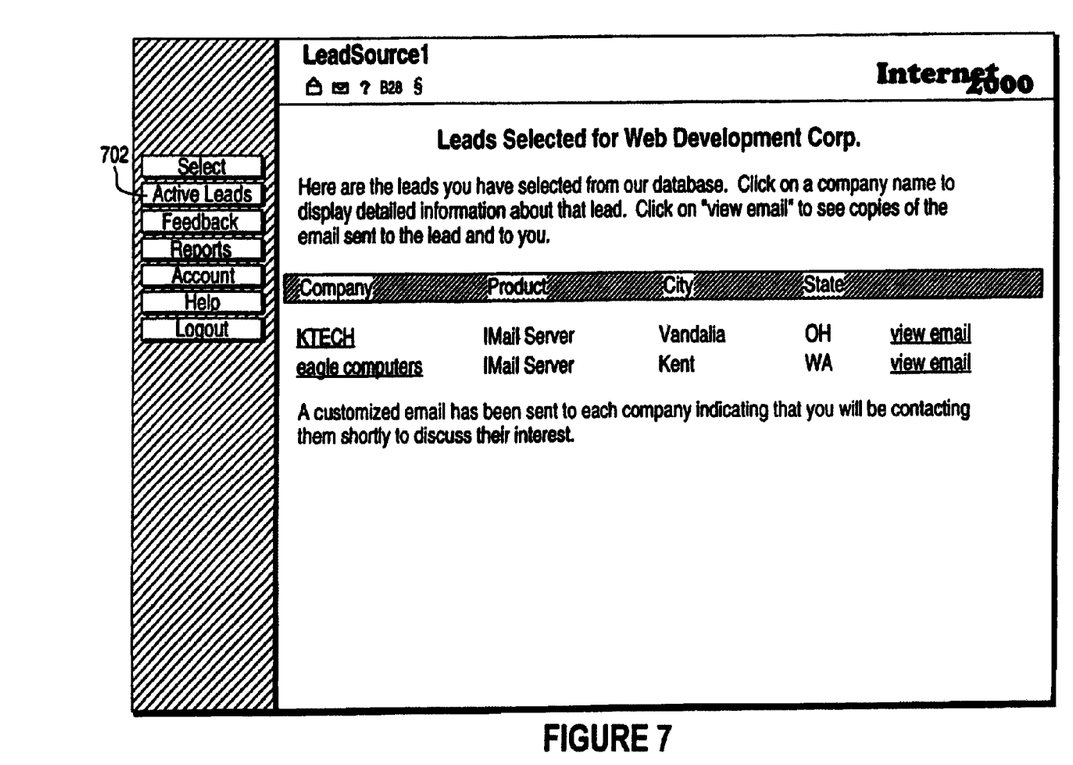
FIG. 7 is an illustration of a computer screen display showing a summary of selected leads according to one embodiment of the present invention.
Figure 8:
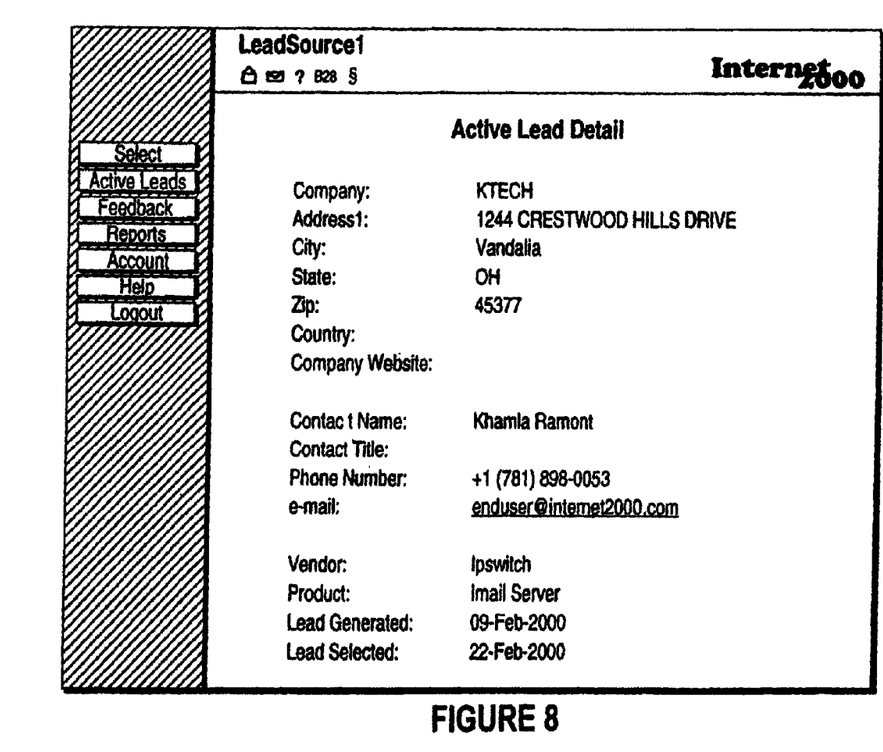
FIG. 8 is an illustration of a computer screen display showing additional detail of a selected lead according to one embodiment of the present invention.

FIG. 7 is an illustration of a computer screen display showing a summary of selected leads according to one embodiment of the present invention. In this example, this page can be accessed by selecting the active leads button 702. The selected contacts are automatically sent 320 a notification that the reseller will be contacting them. As described above, when compared to conventional systems this reduces the chances that a contact will become cold while providing a motivation to promptly contact the lead. The system then provides additional information about the selected leads to the reseller. FIG. 8 is an illustration of a computer screen display showing additional detail of a selected lead according to one embodiment of the present invention. This information is used by the reseller to contact the lead. If necessary, the reseller, after seeing the additional information, can de-select a lead. In this situation the lead will placed back into the active set of leads. An additional notification may be automatically or manually sent to the lead and the de-selection may be stored in the reseller's record in the reseller unit 112.

Figure 9:
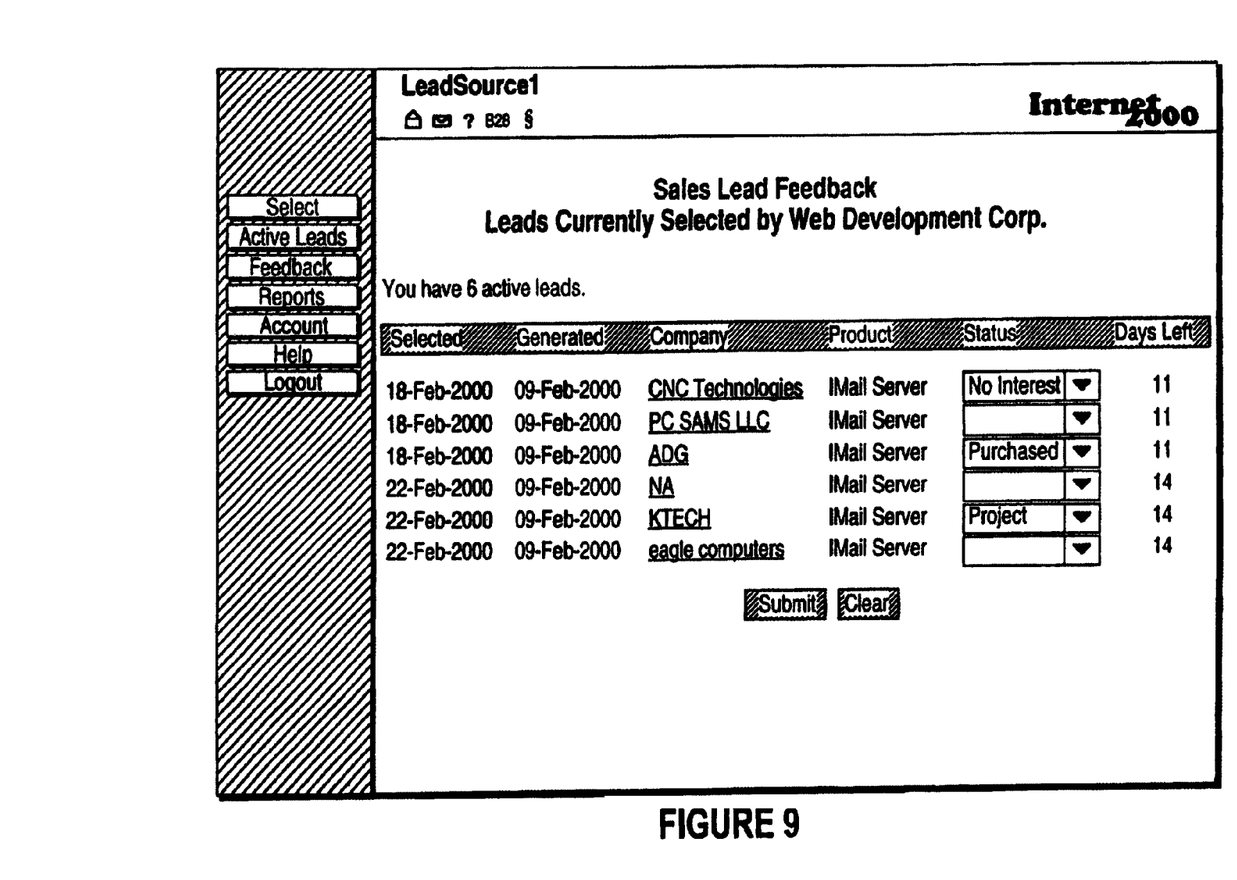
FIG. 9 is an illustration of a computer screen display showing how a user provides feedback about lead results according to one embodiment of the present invention.

After contacting the lead, the reseller may process 210 the lead. FIG. 9 is an illustration of a computer screen display showing how a user provides feedback about lead results according to one embodiment of the present invention. In this example, each of the selected leads is listed and a drop-down box is available under the "Status" field which enables the reseller to select one of several options. In this example, the options include "Purchased," "No Interest," and "Project." The user selects the proper result and then selects the "submit" button on the computer screen.

In addition, the present invention can automatically prepare reports. The reports provide a timely and accurate method for the reseller, the administrator and/or the vendor or lead source to check the status and/or history of leads. Reports may be presented in one or more formats, e.g., tabular, graphs, on a computer display, and/or as print-outs. In an embodiment, a report may include but not be limited to information about the number of leads processed, the number of leads converted to sales, the number of leads in active use and the number of leads processed by a reseller. In the preferred embodiment, reports automate the process of providing accurate, timely feedback to the vendor, lead source or lead. The vendor control unit 134 controls the content of a report so that a vendor or lead source will only be able to access information about leads that they have provided. The reseller control unit 112 controls the content of reports so that each reseller sees reports only about their active and processed leads.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer based method for providing leads to a sales agent from a remotely located electronic lead database system to enable the sales agent to contact the lead to determine interest in at least one of a product or a service, the electronic lead database system comprising an administrative unit and operated by a third party not under the control of the sales agent, the method comprising the steps of:
   receiving by the electronic lead database system an electronic lead request from a sales agent;
   providing a lead from the electronic lead database system to the sales agent in response to the lead request;
   receiving by the electronic lead database system a lead selection from the sales agent, the lead selection providing an electronic lead selection signal to the administrative unit indicating that the sales agent elects to contact the lead;
   moving the lead from an active set of the electronic lead database system to a selected set of the electronic lead database system for a predetermined time period, wherein leads in the selected set cannot be provided to a second sales agent; and
   responsive to detecting the electronic lead selection signal by the administrative unit, triggering an automatic transmission from the electronic lead database system of a first confirmation message to the lead prior to the sales agent contacting the lead, the first confirmation message for introducing the lead to the sales agent.

2. The method of claim 1 wherein the lead request includes a lead selection parameter.

3. The method of claim 1 wherein the lead includes at least one of the group consisting of contact information and product information.

4. The method of claim 1 wherein the sales agent comprises one of the group consisting of a reseller, salesperson, and service provider.

5. The method of claim 1 wherein the lead request comprises at least one of the group consisting of a service request and a product request.

6. The method of claim 1 further comprising:
   sending a second confirmation message to the sales agent.

7. The method of claim 6 wherein the first and second confirmation messages are sent via a wide area network.

8. The method of claim 7 wherein said wide area network is an Internet.

9. The method of claim 1 further comprising:
   sending a third confirmation message to an administrator.

10. The method of claim 1 wherein the step of providing further comprises:
    determining whether the lead request is authorized for the sales agent.

11. The method of claim 1 wherein the step of providing further comprises:
    receiving, from the sales agent, a lead selection parameter;
    searching the electronic lead database for the lead selection parameter to generate a search result; and
    providing the search result to the sales agent.

12. The method of claim 11 wherein the lead selection parameter comprises one of geographical location and product.

13. The method of claim 1 further comprising:
    replacing the lead into the active set of the electronic lead database to make the lead available for a second lead request after the predetermined time period has expired.

14. The method of claim 13 wherein the second lead request is issued by a second sales agent.

15. The method of claim 1 further comprising:
    receiving, from the sales agent, a message comprising a result for the lead; and
    storing the result in the electronic lead database.

16. The method of claim 15 further comprising:
    parsing the message to identify the result.

17. The method of claim 15 further comprising:
    sending at least one of the group consisting of a result confirmation to the sales agent and a result notification to the lead.

18. A method for requesting a lead by a sales agent, the method comprising the steps of:
    sending a lead request to an electronic lead database system, the electronic lead database system comprising an administrative unit and operated by a third party not under the control of the sales agent;
    receiving a lead from the electronic lead database system;
    sending a lead selection to the electronic lead database, the lead selection providing an electronic lead selection signal to the administrative unit indicating that the sales agent has selected the lead, the sales agent for contacting the lead to determine interest in at least one of a product and a service, wherein the lead in the electronic lead database system is moved to a selected set of the electronic lead database for a predetermined time period after sending the lead selection, wherein leads in the selected set cannot be provided to a second sales agent and further wherein responsive to detecting the electronic lead selection signal by the administrative unit, automatic transmission from the electronic lead database system of an automatic first confirmation message to the lead is triggered prior to the sales agent contacting the lead, the first confirmation message for introducing the lead to the sales agent.

19. The method of claim 18 wherein the lead request comprises a service request.

20. The method of claim 18 further comprising:
    sending a lead selection parameter to the electronic lead database for querying a subset of leads.

21. The method of claim 18 further comprising:
    processing the selected lead to determine a result for the selected lead.

22. The method of claim 21 wherein the result comprises one of the group consisting of a sale, a no interest response, an evaluation, and a project.

23. The method of claim 21 wherein the step of processing the selected lead further comprises:
    identifying the result for the selected lead; and
    sending the result to the electronic lead database for storage of the result.

24. A system for providing leads from a electronic lead database to enable a sales agent to contact the leads to determine interest in at least one of a product or a service, the system operated by a third party not under the control of the sales agent and comprising:
  a lead unit configured to receive a lead request from a sales agent;
  a lead control unit communicatively coupled to the lead unit and configured to provide a lead from the electronic lead database to the sales agent in response to the lead request;
  an administrative unit communicatively coupled to the lead control unit and configured to receive an electronic lead selection signal responsive to a lead selection from the sales agent, the lead selection indicating that the sales agent elects to contact the lead;
  a timing unit configured to move the lead from an active set of the electronic lead database to a selected set of the electronic lead database for a predetermined time period wherein leads in the selectedset cannot be provided to a second sales agent; and
  an input/output unit communicatively coupled to the administrative unit and configured to transmit an automatic first confirmation message to the lead prior to the sales agent contacting the lead upon being triggered by the administrative unit responding to detection of the electronic lead selection signal, the first confirmation message for introducing the lead to the sales agent.

25. The system of claim 24 wherein the administrative unit is further configured to receive, from the sales agent, a lead selection parameter, wherein the lead control unit is further configured to search the lead for the lead selection parameter to generate a search result and to provide the search result to the sales agent.

26. The system of claim 24 further comprising:
  a reseller control unit communicatively coupled to the lead unit and configured to determine whether the lead request is authorized for the sales agent.

27. The system of claim 24 wherein the administrative control unit is further configured to send a second confirmation message to the sales agent.

28. The system of claim 24 wherein the timing unit is further configured to replace the lead into the active set of the electronic lead database to make the lead available for a second lead request after the predetermined time period has expired.

29. The system of claim 24 further comprising:
  a lead status unit configured to receive, from the sales agent, a message comprising a result for the lead and to store the result in the electronic lead database.

30. The system of claim 29 wherein the result comprises one of the group consisting of a sale, a no interest response, an evaluation, and a project.

31. A computer readable medium for providing leads to a sales agent from a remotely located electronic lead database system to enable the sales agent to contact the lead to determine interest in at least one of a product or a service, the electronic lead database system comprising an administrative unit and operated by a third party not under the control of the sales agent, the computer readable medium comprising:
  program instructions for receiving a lead request from a sales agent;
  program instructions for providing a lead from the electronic lead database to the sales agent in response to the lead request the sales agent capable of contacting the lead to determine interest in at least one of a product and a service; and
  program instructions for receiving a lead selection from the sales agent, the lead selection providing an electronic lead selection signal to the administrative unit and indicating that the sales agent elects to contact the lead;
  program instructions for moving the lead from an active set of the electronic lead database to a selected set of the electronic lead database for a predetermined time period, wherein leads in the selected set cannot be provided to a second sales agent; and
  program instructions for triggering, responsive to detecting the electronic lead selection signal by the administrative unit, transmission from the electronic lead database system of a first confirmation message to the lead prior to the sales agent contacting the lead, the first confirmation message for introducing the lead to the sales agent.

32. The computer readable medium of claim 31 further comprising:
  program instructions for removing the lead from the electronic lead database to prevent the lead from being provided to a second sales agent.

33. The computer readable medium of claim 31 further comprising:
  program instructions for replacing the lead into the active set of the electronic lead database to make the lead available for a second lead request after the predetermined time period has expired.

34. The computer readable medium of claim 31 further comprising:
  program instructions for receiving, from the sales agent, a message comprising a result for the lead; and
  program instructions for storing the result in the electronic lead database.

35. The computer readable medium of claim 34 further comprising:
  program instructions for sending at least one of a result confirmation to the sales agent and a result notification to the lead.

36. A method for providing leads to a sales agent from a remotely located electronic lead database system to enable the sales agent to contact the leads to determine interest in at least one of a product or a service, the electronic lead database system comprising an administrative unit and operated by a third party not under the control of the sales agent, the method comprising the steps of:
  receiving by the electronic lead database system an electronic lead request from a sales agent;
  providing a lead from the electronic lead database system to the sales agent in response to the lead request;
  moving the lead from an active set of the electronic lead database system to a selected set of the electronic lead database system for a predetermined time period, wherein leads in the selected set cannot be provided to a second sales agent;
  triggering an automatic transmission from the electronic lead database system of a first electronic confirmation message to the lead prior to the sales agent contacting the lead, the first electronic confirmation message for introducing the lead to the sales agent, wherein the automatic transmission is triggered responsive to detecting an electronic lead selection signal by the administrative unit generated in response to the sales agent selecting a lead.

37. The method of claim 36 wherein the lead request includes a lead selection parameter.

38. The method of claim 36 wherein the lead includes at least one of contact information and product information.

39. The method of claim 36 wherein the sales agent comprises one of a reseller, a salesperson, and a service provider.

40. The method of claim 36 wherein the lead request comprises at least one of the group consisting of a service request and a product request.

41. The method of claim 36 wherein the first confirmation message is sent via a wide area network.

42. The method of claim 41 wherein said wide area network is an Internet.

43. The method of claim 36 further comprising:
sending a second confirmation message to an administrator.

44. The method of claim 36 wherein the step of providing further comprises:
determining whether the lead request is authorized for the sales agent.

45. The method of claim 36 wherein the step of providing further comprises:
receiving, from the sales agent, a lead selection parameter;
searching the lead for the lead selection parameter to generate a search result; and
providing the search result to the sales agent.

46. The method of claim 45 wherein the lead selection parameter comprises one of the group consisting of a geographical location and a product.

47. The method of claim 36 further comprising:
removing the lead from the electronic lead database to prevent the lead from being provided to a second sales agent.

48. The method of claim 36 further comprising:
providing the lead from the electronic lead database to a second sales agent in response to a second lead request, the second sales agent for contacting the lead to determine interest in at least one of a product and a service; and
sending a second electronic confirmation message to the lead, the second electronic confirmation message configured to indicate that the second sales agent has elected to contact the lead.

49. The method of claim 36 further comprising:
receiving, from the sales agent, a message comprising a result for the lead; and
storing the result in the electronic lead database.

50. The method of claim 49 further comprising:
parsing the message to identify the result.

51. The method of claim 49 further comprising:
sending at least one of a result confirmation to the sales agent and a result notification to the lead.

52. The method of claim 36, further comprising:
receiving by the electronic lead database a lead selection from the sales agent, the lead selection indicating that the sales agent elects to contact the lead.

53. The method of claim 36, further comprising:
sending a second electronic confirmation message to the sales agent.

* * * * *